(12) United States Patent
Ku et al.

(10) Patent No.: US 12,522,206 B2
(45) Date of Patent: Jan. 13, 2026

(54) VEHICLE DRIVING CONTROL APPARATUS AND CONTROL METHOD AND DISPLAY METHOD FOR THE SAME

(71) Applicant: Industrial Technology Research Institute, Hsinchu (TW)

(72) Inventors: Kun-Lung Ku, Changhua County (TW); Wen-Han Lu, Chiayi County (TW); Chia-Jui Hu, New Taipei (TW); Ching-Wen Chen, Taipei (TW); Tse-Lin Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 481 days.

(21) Appl. No.: 17/563,104

(22) Filed: Dec. 28, 2021

(65) Prior Publication Data
US 2023/0166726 A1 Jun. 1, 2023

(30) Foreign Application Priority Data
Nov. 29, 2021 (TW) ................... 110144442

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/20* (2013.01); *B60W 30/0956* (2013.01);
(Continued)

(58) Field of Classification Search
CPC .. B60W 30/09; B60W 10/20; B60W 30/0956; B60W 40/10; B60W 40/13;
(Continued)

(56) References Cited

U.S. PATENT DOCUMENTS

| | | | | |
|---|---|---|---|---|
| 6,889,140 B2 * | 5/2005 | Isogai | ................. | B60T 8/17558 180/170 |
| 7,425,889 B2 * | 9/2008 | Widmann | ............... | B60R 1/003 340/425.5 |

(Continued)

FOREIGN PATENT DOCUMENTS

| | | |
|---|---|---|
| CN | 106846901 | 6/2017 |
| CN | 104960466 | 11/2017 |

(Continued)

OTHER PUBLICATIONS

Horst, J.; Barbera, A.; "Trajectory Generation for an On-Road Autonomous Vehicle"; NIST IR; Sep. 2005; https://tsapps.nist.gov/publication/get_pdf.cfm?pub_id=823570; Accessed: Apr. 25, 2025 (Year: 2005).*

(Continued)

*Primary Examiner* — Tiffany P Young
*Assistant Examiner* — Leah N Miller
(74) *Attorney, Agent, or Firm* — JCIPRNET (57) ABSTRACT

A vehicle driving control apparatus and a control method and a display method for the same are provided. The vehicle driving control apparatus includes a sensor and a processor. The sensor detects current relative position and current relative velocity of an object around a vehicle. The processor calculates a collision probability between the vehicle and the object based on the current relative position and current relative velocity of the object, and determines whether to adjust a driving dynamics of the vehicle based on the collision probability.

24 Claims, 7 Drawing Sheets

(51) Int. Cl.
*B60W 30/095* (2012.01)
*B60W 40/10* (2012.01)
*B60W 40/13* (2012.01)
*B60W 50/14* (2020.01)

(52) U.S. Cl.
CPC ............ *B60W 40/10* (2013.01); *B60W 40/13* (2013.01); *B60W 50/14* (2013.01); *B60W 2050/146* (2013.01); *B60W 2510/202* (2013.01); *B60W 2554/4041* (2020.02); *B60W 2554/4044* (2020.02); *B60W 2710/202* (2013.01)

(58) Field of Classification Search
CPC ........... B60W 50/14; B60W 2050/146; B60W 2510/202; B60W 2554/4041; B60W 2554/4044; B60W 2710/202; B60W 2554/802; B60W 2554/804; B60W 2720/106
USPC ......................................................... 701/301
See application file for complete search history.

(56) References Cited

U.S. PATENT DOCUMENTS

| | | | | |
|---|---|---|---|---|
| 9,308,938 | B2* | 4/2016 | Sawada | B62D 15/0265 |
| 10,446,021 | B2 | 10/2019 | Carrasco et al. | |
| 10,949,885 | B2* | 3/2021 | Xiao | B60W 10/18 |
| 11,001,256 | B2 | 5/2021 | Packer et al. | |
| 2003/0139883 | A1* | 7/2003 | Takafuji | G01P 15/00 340/436 |
| 2013/0211676 | A1* | 8/2013 | Benyo | B62D 15/025 701/42 |
| 2013/0293395 | A1* | 11/2013 | Ohama | G08G 1/166 340/904 |
| 2013/0321628 | A1* | 12/2013 | Eng | B60R 1/31 348/148 |
| 2016/0297432 | A1* | 10/2016 | Fletcher | B62D 13/06 |
| 2017/0039865 | A1* | 2/2017 | Takabayashi | G08G 1/166 |
| 2018/0334188 | A1* | 11/2018 | Maier | G06T 7/13 |
| 2019/0265695 | A1 | 8/2019 | Udagawa et al. | |
| 2021/0171023 | A1* | 6/2021 | Shalev-Shwartz | B60W 60/0027 |
| 2021/0311490 | A1 | 10/2021 | Fridman | |

FOREIGN PATENT DOCUMENTS

| | | | | |
|---|---|---|---|---|
| CN | 108860143 | B * | 6/2020 | ................ B60T 7/22 |
| CN | 111731283 | | 10/2020 | |
| DE | 102004048530 | A1 * | 4/2006 | ........... B62D 15/025 |
| DE | 102009003220 | A1 * | 11/2010 | ............. B60K 35/00 |
| GB | 2541354 | A * | 2/2017 | ......... B60W 30/095 |
| JP | 5358978 | B2 * | 12/2013 | |
| TW | 201704067 | | 2/2017 | |
| TW | I584979 | | 6/2017 | |
| TW | M576981 | | 4/2019 | |
| TW | I717102 | | 1/2021 | |
| WO | WO-2017055738 | A1 * | 4/2017 | ............ B60W 30/09 |
| WO | WO-2020130604 | A1 * | 6/2022 | ............ B60W 10/20 |

OTHER PUBLICATIONS

"Office Action of Taiwan Counterpart Application", issued on Mar. 7, 2023, pp. 1-15.

Ruinu Wang et al., "Difference of Radius between Inner Wheels for Vehicles on Urban Road and Safety Countermeasures," Open Journal of Transportation Technologies, May 2014, pp. 72-79.

Chung-Yu Tsai et al., "Algebraic General Trajectory Formula for Semitrailer Truck Vehicles," IEEE Transactions on Automation Science and Engineering, vol. 18, Oct. 2021, pp. 2156-2165.

Leonardo Guevara et al., "Collision-free navigation of N-trailer vehicles with motion constraints, " 2019 12th International Workshop on Robot Motion and Control (RoMoCo), Jul. 2019, pp. 118-123.

Rui Oliveira et al., "A Geometric Approach to On-road Motion Planning for Long and Multi-Body Heavy-Duty Vehicles," 2020 IEEE Intelligent Vehicles Symposium (IV), Oct. 2020, pp. 999-1006.

Andrew Blake et al., "FPR—Fast Path Risk Algorithm to Evaluate Collision Probability," IEEE Robotics and Automation Letters, vol. 5, Jan. 2020, pp. 1-7.

Jaehwan Kim et al., "Collision Risk Assessment Algorithm via Lane-Based Probabilistic Motion Prediction of Surrounding Vehicles," IEEE Transactions on Intelligent Transportation Systems, vol. 19, Sep. 2018, pp.2965-2976.

Hiroaki Minoura et al., "Path Predictions using Object Attributes and Semantic Environment," 14th International Conference on Computer Vision Theory and Applications, Jan. 2019, pp. 19-26.

* cited by examiner

VEHICLE DRIVING CONTROL APPARATUS AND CONTROL METHOD AND DISPLAY METHOD FOR THE SAME

CROSS-REFERENCE TO RELATED APPLICATION

This application claims the priority benefit of Taiwan application serial no. 110144442, filed on Nov. 29, 2021. The entirety of the above-mentioned patent application is hereby incorporated by reference herein and made a part of this specification.

BACKGROUND

Technical Field

The disclosure relates to a vehicle driving control apparatus, and particularly relates to a vehicle driving control apparatus for large vehicles and a control method and a display method for the same.

Description of Related Art

When a large vehicle makes a turn, due to a long wheel base of a vehicle body, movement trajectories of front and rear wheels are not overlapped with each other, a turning radius of the front wheel on an inner side of a curve is larger, and a turning radius of the rear wheel on the inner side of the curve is smaller, so that there is a difference of radius between inner wheels. Generally, the longer the wheel base of the vehicle body is, the greater the difference of radius between inner wheels is. For example, a difference of radius between inner wheels of a large truck is 3.5-4.5 meters, while a difference of radius between inner wheels of a trailer is 6-7.5 meters. The larger difference of radius between inner wheels is likely to cause side collisions of large vehicles due to visual blind spots.

In order to prevent the side collision caused by the difference of radius between inner wheels, the prior art measures distances of the surrounding objects of the large vehicle and provides a warning signal when determining that the large vehicle will collide with the surrounding objects during a turning process.

SUMMARY

The disclosure is directed to a vehicle driving control apparatus and a control method and a display method for the same, by calculating collision probability between a vehicle and surrounding objects, it is determined whether to adjust driving dynamics of the vehicle, and an expected collision point is estimated and displayed.

An embodiment of the disclosure provides a vehicle driving control apparatus. The vehicle driving control apparatus includes a sensor and a processor. The sensor senses a current relative position and a current relative velocity of at least one object around a vehicle. The processor is coupled to the sensor, and the processor calculates at least one collision probability between the vehicle and the at least one object based on the current relative position and the current relative velocity of the at least one object, and determines whether to adjust a driving dynamics of the vehicle based on the at least one collision probability.

An embodiment of the disclosure provides a control method for vehicle driving including following steps. A current relative position and a current relative velocity of at least one object around a vehicle are sensed. At least one collision probability between the vehicle and the at least one object is calculated based on the current relative position and the current relative velocity of the at least one object. It is determined whether to adjust a driving dynamics of the vehicle based on the at least one collision probability.

An embodiment of the disclosure provides a display method for vehicle driving including following steps. A current relative position and a current relative velocity of at least one object around a vehicle are sensed, and a current position and a current velocity of the vehicle are sensed. At least one collision probability between the vehicle and the at least one object is calculated based on the current relative position and the current relative velocity of the at least one object, and an expected trajectory of the vehicle is calculated based on the current position and the current velocity of the vehicle. An expected collision point of the vehicle is estimated based on the at least one collision probability. The expected trajectory and the expected collision point are displayed.

Based on the above description, in some embodiments of the disclosure, collision probability between the vehicle and the surrounding objects may be calculated based on the current relative positions and current relative velocities of the surrounding objects, and it is determined whether to assist adjusting the driving dynamics of the vehicle based on the collision probability, so as to prevent side collision accidents caused by a difference of radius between inner wheels. On the other hand, the disclosure further estimates and displays the expected collision point based on the collision probability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

A term "couple" (or "connect") used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 1:
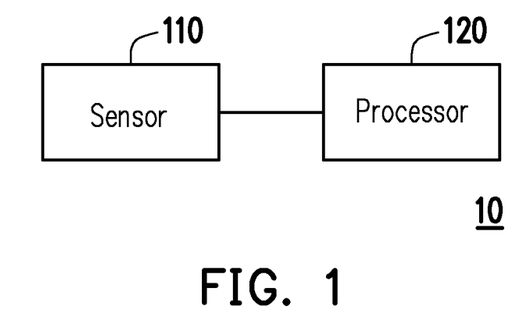
FIG. 1 is a block diagram of a vehicle driving control apparatus according to an embodiment of the disclosure.
Figure 2:
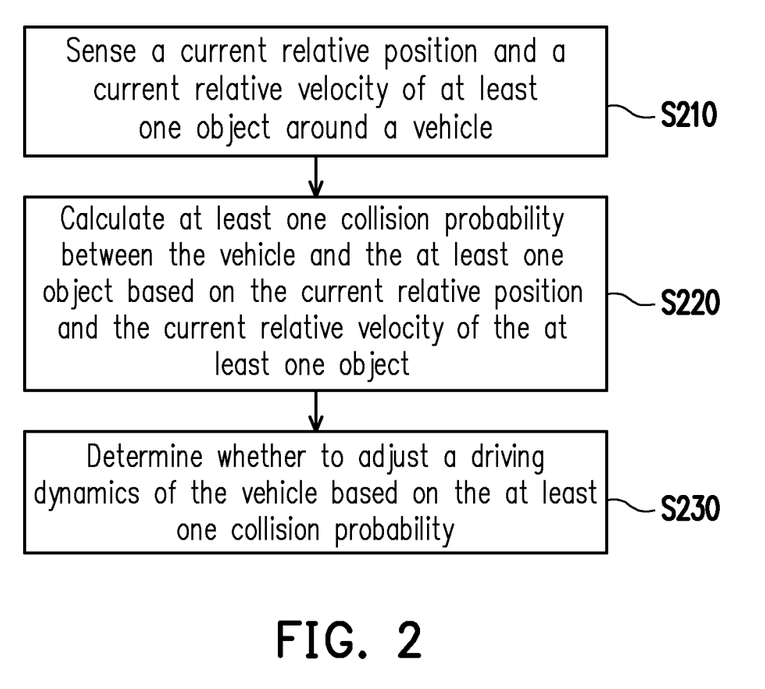
FIG. 2 is a flowchart of a control method for vehicle driving according to an embodiment of the disclosure.

FIG. 1 is a block diagram of a vehicle driving control apparatus according to an embodiment of the disclosure. FIG. 2 is a flowchart of a control method for vehicle driving according to an embodiment of the disclosure. Referring to FIG. 1 and FIG. 2 at the same time, a vehicle driving control apparatus 10 includes but is not limited to a sensor 110 and a processor 120, where the processor 120 is coupled to the sensor 110. In an embodiment of the disclosure, the vehicle driving control apparatus 10 is configured on a vehicle, and the vehicle driving control apparatus 10 may receive a plurality of sensing data and map information through the sensor 110 and a communication device (not shown) of the vehicle, so as to obtain relative positions, relative velocities and object types of objects around the vehicle, and calculate collision probabilities between the vehicle and the surrounding objects based on the relative positions, the relative velocities and the object types of the objects around the vehicle. The collision probabilities may be further used for velocity control and steering control of the vehicle, and may also be used to calculate an expected collision point and display it on a display device of the vehicle.

In an embodiment, the sensor 110 may include a camera, a LiDAR, a radar, an accelerometer, a gyroscope, a weather sensor, a wheel speedometer, etc. The processor 120, for example, includes a central processing unit (CPU), a microprocessor, a digital signal processor (DSP), a programmable controller, a programmable logic device (PLD) or other similar devices or combinations of these devices, which is not limited by the disclosure.

In step S210, the sensor 110 senses at least one object around the vehicle to obtain a current relative position and a current relative velocity of the at least one object. In an embodiment, a LiDAR or a radar in the sensor 110 directly measures a distance and a velocity of the at least one object around the vehicle to obtain the current relative position and the current relative velocity of the at least one object relative to the vehicle. In addition, a camera in the sensor 110 may also obtain image data of at least one object around the vehicle, and the processor 120 may obtain a type of the at least one object (such as a street lamp, an automobile, or a pedestrian, etc.) by recognizing the image data. In other embodiments, the processor 120 may receive map information through the communication device of the vehicle, and obtain the current relative position of the at least one object according to the map information. The map information includes, for example, roads and object information beside the roads, such as street lamps, safety islands, fire hydrants, etc.

Then, in step S220, the processor 120 receives the current relative position and the current relative velocity of the at least one object from the sensor 110, and the processor 120 calculates at least one collision probability between the vehicle and the at least one object based on the current relative position and the current relative velocity of the at least one object. For example, based on the current relative position and the current relative velocity of the street lamp, the processor 120 may calculate that the collision probability between the vehicle and the street lamp after 1 second is 70%. Since it is based on the current relative position and the current relative velocity of the object to calculate whether a position of the object is overlapped with that of the vehicle at a certain time in the future, if the object itself has acceleration/deceleration capability, such as a bicycle or a car, an extreme value range of acceleration/deceleration of the object itself may be considered to generate the collision probability. Detailed calculation method of the collision probability is described in FIG. 3.

In step S230, the processor 120 determines whether to adjust a driving dynamics of the vehicle according to the at least one collision probability. In an embodiment, the processor 120 may determine whether to adjust a velocity of the vehicle to prevent a collision according to the collision probability, for example, to brake to reduce the velocity to prevent collision with an object, or provide an auxiliary torque to assist a steering motor (not shown) to drive the vehicle to perform steering, such as reducing a steering angle to prevent collision with the object. Furthermore, to prevent the collision between the vehicle and the object may be to prevent the collision between any part of a vehicle body and the object, such as a frontal collision or a side collision, but the disclosure it is not limited thereto. The specific judgment method for adjusting the driving dynamics of the vehicle is to be described in detail in FIG. 4 (velocity control) and FIG. 6 (steering control).

Figure 3:
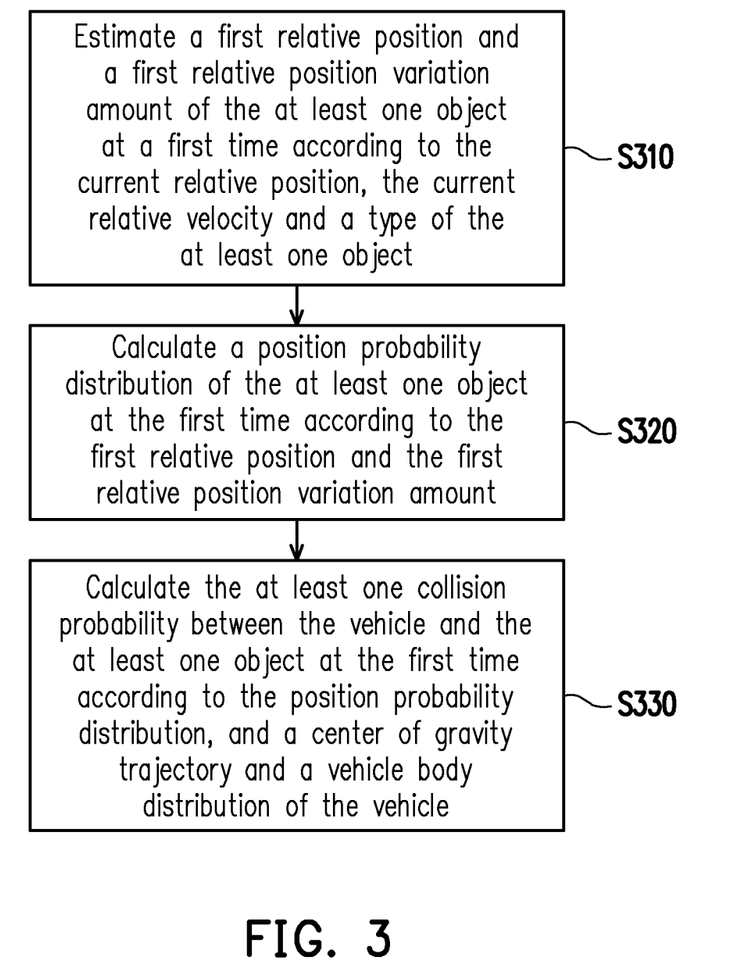
FIG. 3 is a flowchart of calculating collision probability according to an embodiment of the disclosure.

FIG. 3 is a flowchart of calculating collision probability according to an embodiment of the disclosure. Referring to FIG. 3, in step S310, the processor 120 estimates a first relative position and a first relative position variation amount of the at least one object at a first time based on the current relative position, the current relative velocity, and the type of the at least one object. To be specific, the processor 120 may estimate the first relative position of the object at the first time in the future according to the current relative position and the current relative velocity of the object, for example, to estimate the first relative position and the first relative velocity after 1 second (the first time) according to a current relative position and a current relative velocity of a Giant® bicycle (the object) relative to the vehicle (the vehicle). On the other hand, the processor 120 may estimate the first relative position variation amount at the first time according to the type of the object. For example, the Giant® bicycle may be identified as a type of bicycle by the processor 120, and the processor 120 may learn that the maximum acceleration of the bicycle is 2 m/s$^2$ through table look-up, and estimate that the first relative position variation amount of the Giant® bicycle after 1 second (the first time) is within a range of 1 m according to a constant acceleration motion equation.

Then, in step S320, the processor 120 calculates a position probability distribution $P_{objcect}$ (x, y, tc) of at least one object at the first time according to the first relative position and the first relative position variation amount. In an embodiment, the position probability distribution $P_{objcect}$ (x, y, tc) may be configured by using a normal distribution, where the normal distribution takes an average as a center line to form a symmetrical unimodal, bell-shaped curve distribution. For example, the position probability distribution $P_{objcect}$ (x, y, tc) may take a first relative position (x,y) of the bicycle after one second (tc=1) as the center line of the normal distribution, and take the first relative position variation amount of the bicycle after one second as a range of a second standard deviation 2σ (with a value of 95.4%) of the normal distribution to configure the position probability distribution $P_{objcect}$ (x, y, tc). Namely, the greater an absolute value of the object acceleration is, the more gentle the position probability distribution $P_{objcect}$ (x, y, tc) is, i.e., the larger an estimated position probability distribution range is. Conversely, the smaller the absolute value of the object acceleration is, the steeper the position probability distribution $P_{objcect}$ (x, y, tc) is, i.e., the smaller the estimated position probability distribution range is.

In step S330, the processor 120 calculates at least one collision probability $P_{collision}$ (tc) between the vehicle and at least one object at the first time tc according to the position probability distribution $P_{objcect}$ (x, y, tc) and a center of gravity trajectory and a vehicle body distribution of the vehicle, referring equation (1):

$$P_{collision}(tc) = \int \tau(x,y) \cdot P_{objcect}(x,y,tc) dxdy \tag{1}$$

Where, $P_{objcect}$ (x, y, tc) is the position probability distribution of the object at the first time tc, and if the processor 120 determines that the positions of the vehicle and the object are overlapped at the first time tc, i(x,y)=1. If the processor 120 determines that the positions of the vehicle and the object are not overlapped at the first time tc, i(x,y)=0. It should be noted that when the vehicle is, for example, a large vehicle or a trailer with a longer wheel base, the vehicle body distribution thereof must be calculated in multiple segments, so that regarding determination of whether the positions of the vehicle and the object are overlapped at the first time tc, not only the center of gravity of the vehicle is considered, a posture of the vehicle or the vehicle body distribution is also considered. For example, when the trailer has two front and rear vehicle bodies, it is required to separately consider whether the front vehicle body and the rear vehicle body are overlapped with the object at the first time tc.

Figure 4:
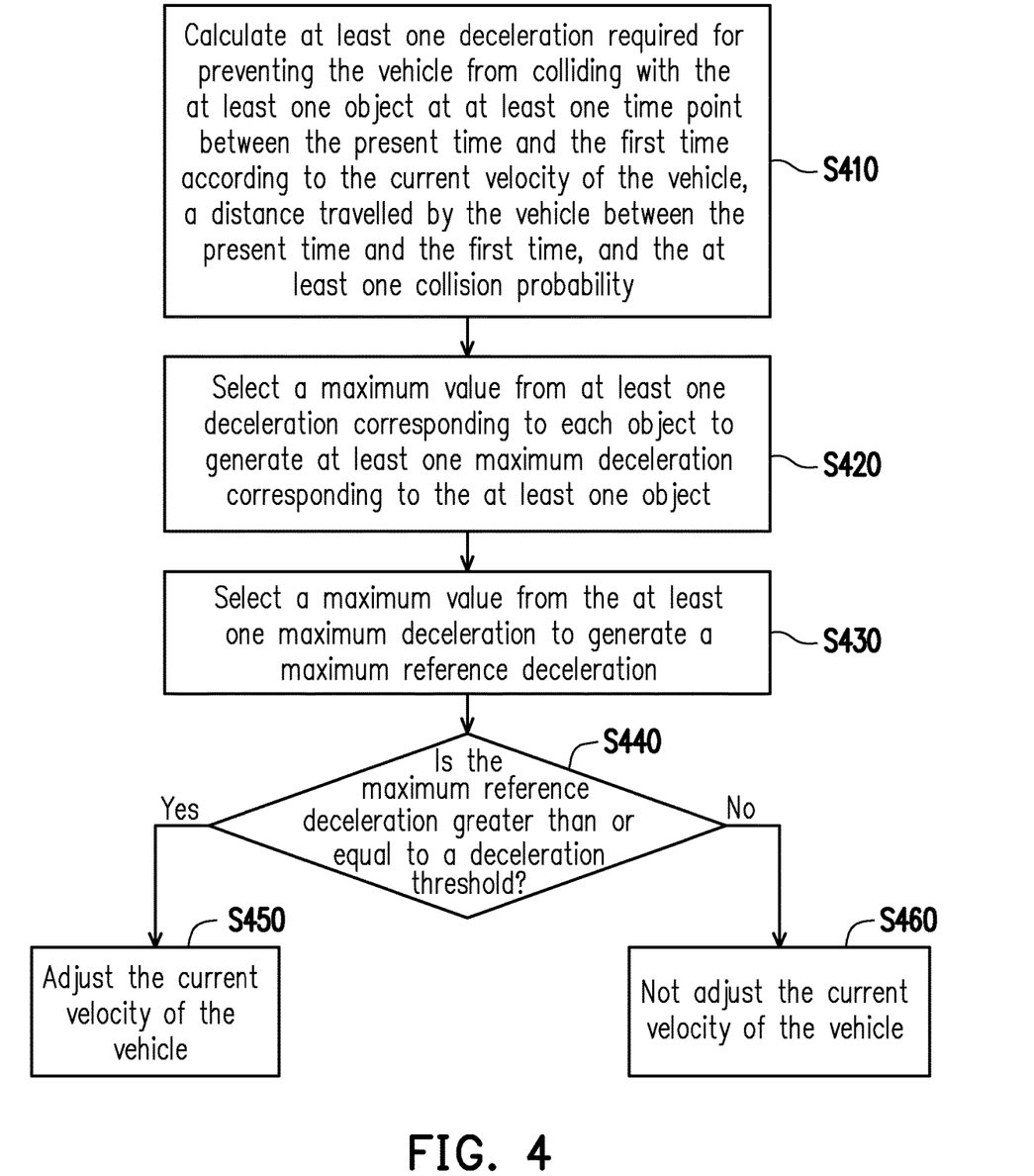
FIG. 4 is a flowchart of velocity control according to an embodiment of the disclosure.

FIG. 4 is a flowchart of velocity control according to an embodiment of the disclosure. Referring to FIG. 4, in step S410, in an embodiment, the processor 120 calculates at least one deceleration $a_{cmd, tc}$ required for prevention the vehicle from colliding with at least one object at least one time point between the current time and the first time tc according to the current velocity $v_{ego}$ of the vehicle, a distance s travelled by the vehicle between the current time and the first time tc, and the at least one collision probability $P_{collision}$ (tc), referring to following equation (2) for details:

$$a_{cmd,tc} = \frac{v_{ego}}{2s} P_{collision}(tc) \tag{2}$$

For example, taking the first time tc in the future as 1 second as an example, 10 time intervals are divided between the current time and the first time tc, the processor 120 may obtain a plurality of decelerations $a_{cmd,0}$, $a_{cmd,0.1}$, $a_{cmd,0.2}$, $a_{cmd,0.3}$, $a_{cmd,0.4}$, $a_{cmd,0.5}$, $a_{cmd,0.6}$, $a_{cmd,0.7}$, $a_{cmd,0.8}$, $a_{cmd,0.9}$, $a_{cmd,1}$ of a certain object. At least one deceleration $a_{cmd,tc}$ between the current time and the first time tc is taken for each object, and the at least one deceleration $a_{cmd,tc}$ of each object is one set, so that the at least one object has at least one set of deceleration $a_{cmd,tc}$.

Figure 5:
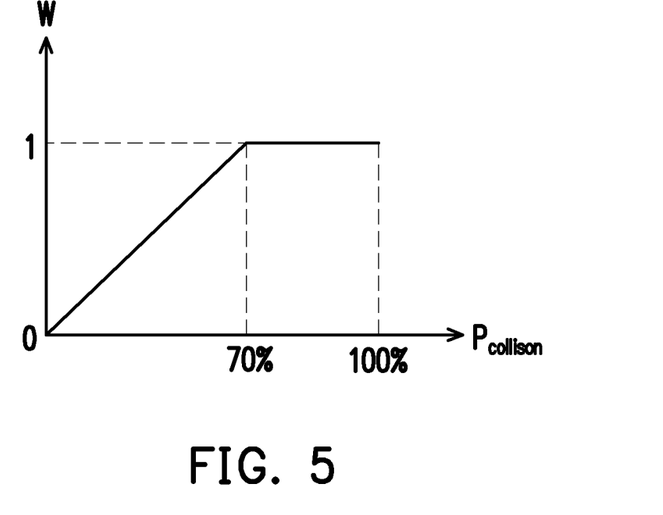
FIG. 5 is a schematic diagram of a weight function drawn according to an embodiment of the disclosure.

In another embodiment, regarding the calculation of the deceleration $a_{cmd,tc}$, the processor 120 further calculates the deceleration $a_{cmd,tc}$ according to a weight function $w(P_{collision}$ (tc)), as shown in a following equations (3) and FIG. 5. FIG. 5 is a schematic diagram of a weight function drawn according to an embodiment of the disclosure. It may be learned from FIG. 5 that the weight function $w(P_{collision}$ (tc)) may have a saturation value, for example, when the collision probability $P_{collision}$ (tc) is less than 70%, the weight function $w(P_{collision}$ (tc)) has a linear correspondence. When the collision probability $P_{collision}$ (tc) is greater than or equal to 70%, the weight function $w(P_{collision}$ (tc)) is fixed to 1. In other embodiments, when the collision probability $P_{collision}$ (tc) is less than 70%, the weight function $w(P_{collision}$ (tc)) may also be nonlinear correspondence. Through the value obtaining method of the saturation value, the weight function $w(P_{collision}$ (tc)) has a higher value relative to the collision probability $P_{collision}$ (tc), so that a higher deceleration $a_{cmd,tc}$ may be obtained, which is equivalent to provide a conservative estimate on the deceleration $a_{cmd,tc}$. The saturation value of 70% in the embodiment is only an example, and the disclosure is not limited thereto.

$$a_{cmd,tc} = \frac{v_{ego}}{2s} w(P_{collision}(tc)) \tag{3}$$

Then, in step S420, the processor 120 selects a maximum value from at least one deceleration $a_{cmd,tc}$ corresponding to each object to generate at least one maximum deceleration $a_{cmd,max}$ corresponding to the at least one object. For example, if a certain object is a bicycle, in order to prevent from colliding with the bicycle, values of a plurality of decelerations $a_{cmd,tc}$ of the vehicle within 1 second between the current time and the first time tc (0, 0.1, 0.2, . . . , 0.9, 1 second) are respectively 0.1, 0.4, 0.6, 0.9, 1.5, 2.1, 2.5, 2.9, 3.4, 2.6, 2.1 m/s², the maximum value of 3.4 m/s² is taken as the maximum deceleration $a_{cmd,max}$ required for the vehicle to shun the bicycle. If there is at least one object, at least one maximum deceleration $a_{cmd,max}$ corresponding to the number of the objects is taken.

In step S430, the processor 120 selects a maximum value from the at least one maximum deceleration $a_{cmd,max}$ to generate a maximum reference deceleration $a_{ref,max}$ of all objects. For example, if the processor 120 calculates that the maximum decelerations $a_{cmd,max}$ respectively required by the vehicle to prevent from collisions with three surrounding objects are 3.4, 1.8, 2.2 m/s², the processor 120 takes 3.4 m/s² as the maximum reference deceleration $a_{ref,max}$.

Then, in step S440, the processor 120 compares the maximum reference deceleration $a_{ref,max}$ with a deceleration threshold $a_{TH}$, and determines whether the maximum reference deceleration $a_{ref,max}$ is greater than or equal to the deceleration threshold $a_{TH}$. When the processor 120 determines that the maximum reference deceleration $a_{ref,max}$ is greater than or equal to the deceleration threshold $a_{TH}$, the flow goes to step S450. When the processor 120 determines that the maximum reference deceleration $a_{ref,max}$ is less than the deceleration threshold $a_{TH}$, the flow goes to step S460. The deceleration threshold $a_{TH}$ is determined according to design requirements, which is, for example, 1 m/s², but the disclosure is not limited thereto.

In step S450, the processor 120 provides a driving signal to a motor to automatically adjust the current velocity $v_{ego}$ of the vehicle to prevent from collision with the object. In step S460, the processor 120 does not provide the driving signal to the motor, and does not automatically adjust the current velocity $v_{ego}$ of the vehicle, and the vehicle is controlled by a driver himself.

Figure 6:
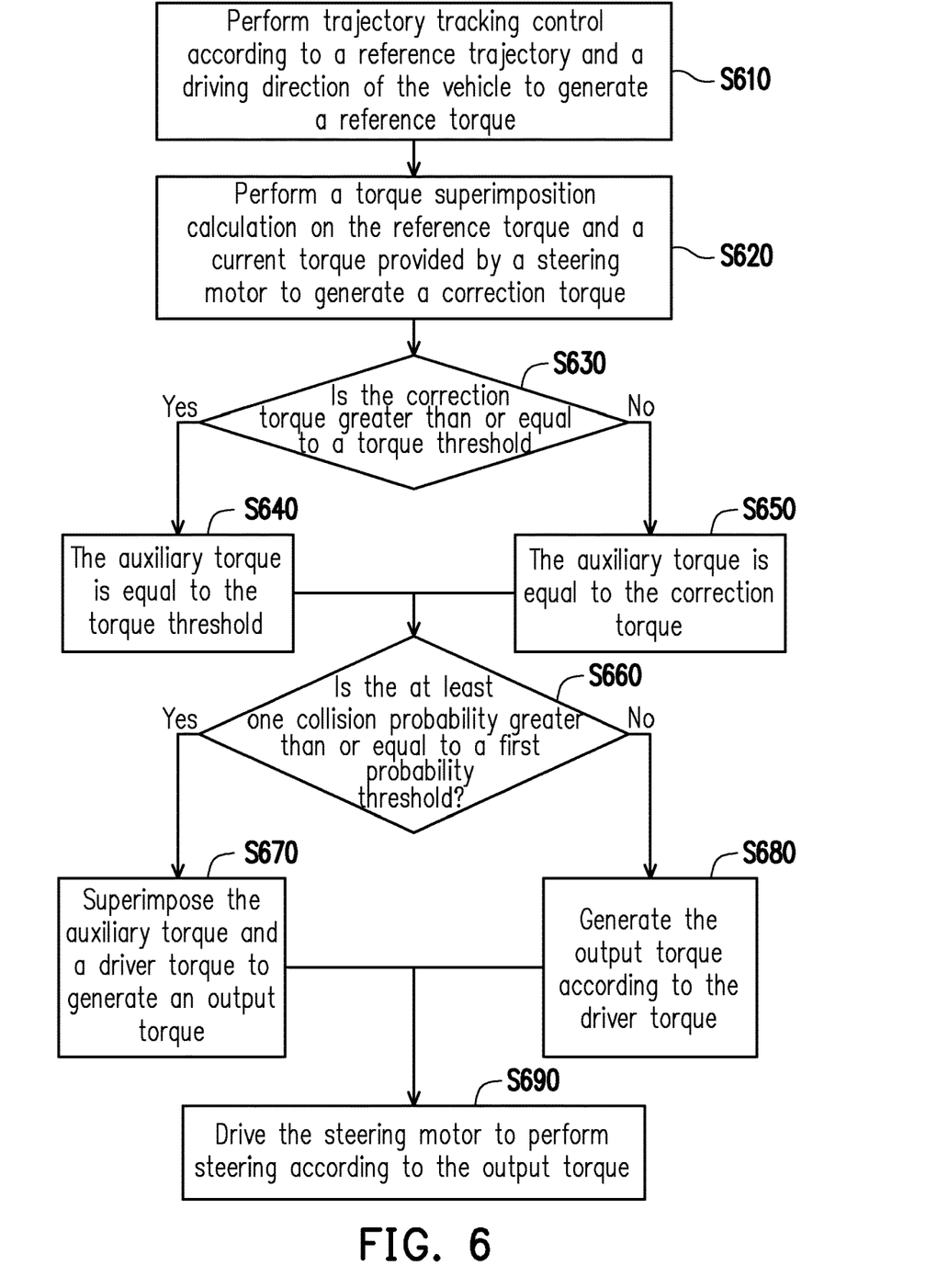
FIG. 6 is a flowchart of steering control according to an embodiment of the disclosure.

FIG. 6 is a flowchart of steering control according to an embodiment of the disclosure. Referring to FIG. 6, in step S610, the processor 120 performs trajectory tracking control according to a reference trajectory and a current driving direction of the vehicle to generate a reference torque $\tau_R$. The reference trajectory is a vehicle recommended path used for preventing from colliding with the object that is calculated by a path planner (not shown) in the vehicle based on a detection result of the at least one object, map information, and the at least one collision probability $P_{collision}$ (tc), the reference torque $\tau_R$ is provided a steering motor of the vehicle to steer the vehicle. In an embodiment, the trajectory tracking control performed by the processor 120 is, for example, to compare the reference trajectory with the current driving direction of the vehicle to generate the reference torque $\tau_R$ for steering the vehicle from the current driving direction to the reference trajectory.

Then, in step S620, the processor 120 performs rotational torque superimposition calculation on the reference torque $\tau_R$ and a current torque $\tau_P$ provided by the steering motor to generate a correction torque $\tau_C$. In step S630, the processor 120 compares the correction torque $\tau_C$ with a torque threshold $\tau_{TH}$, and determines whether the correction torque $\tau_C$ is greater than or equal to the torque threshold $\tau_{TH}$. When the correction torque $\tau_C$ is greater than or equal to the torque threshold $\tau_{TH}$, the flow goes to step S640. When the correction torque $\tau_C$ is less than the torque threshold $\tau_{TH}$, the flow goes to step S650.

In step S640, since the correction torque $\tau_C$ is greater than or equal to the torque threshold $\tau_{TH}$, the processor 120 sets an auxiliary torque $\tau_A$ to be equal to the torque threshold $\tau_{TH}$. For example, it is assumed that the torque threshold $\tau_{TH}$ is 3.5 N/m, when the correction torque $\tau_C$ is 4 N/m, the processor 120 sets the auxiliary torque $\tau_A$ to 3.5 N/m to implement operating safety restriction and prevent excessive correction torque $\tau_C$ that may cause the vehicle to oversteer in a short period of time. In step S650, since the correction torque $\tau_C$ is less than the torque threshold $\tau_{TH}$, the processor 120 sets the auxiliary torque $\tau_A$ to be equal to the correction torque Tc. For example, it is assumed that the torque threshold $\tau_{TH}$ is 3.5 N/m, when the correction torque $\tau_C$ is 2.5 N/m, the processor 120 sets the auxiliary torque $\tau_A$ to 2.5 N/m.

Then, in step S660, the processor 120 compares the collision probability $P_{collision}$ (tc) of the at least one object at the first time tc that is calculated in FIG. 2 with a preset first probability threshold $P_{TH1}$, and determines whether at least one of the at least one collision probability $P_{collision}$ (tc) is greater than or equal to the first probability threshold $P_{TH1}$. When the processor 120 determines that at least one of the at least one collision probability $P_{collision}$ (tc) is greater than or equal to the first probability threshold $P_{TH1}$, the flow goes to step S670. When the processor 120 determines that each of the at least one collision probability $P_{collision}$ (tc) is less than the first probability threshold $P_{TH1}$, the flow goes to step S680. In step S670, the processor 120 superimposes the auxiliary torque $\tau_A$ and a driver torque $\tau_D$ provided by the driver through a steering wheel to generate an output torque $\tau_{OUT}$. In step S680, the processor 120 generates the output torque $\tau_{OUT}$ only based on the driver torque $\tau_D$. In step S690, the processor 120 drives the steering motor according to the output torque $\tau_{OUT}$ to steer the vehicle.

In other words, the first probability threshold $P_{TH1}$ is an auxiliary intervention condition of the set auxiliary torque $\tau_A$. When the collision probability $P_{collision}$ (tc) is higher than the auxiliary intervention condition of the auxiliary torque $T_A$, the auxiliary torque $\tau_A$ is superimposed on the driver torque $\tau_D$ to provide additional torque for assisting steering and prevent from collision with objects. Otherwise, no superimposition is performed, and a steering action is simply controlled by the driver. It should be noted that the current torque $\tau_P$, the reference torque $T_R$, the correction torque Tc, the auxiliary torque $T_A$, the driver torque $T_D$, and the output torque $\tau_{OUT}$ mentioned above are all torque commands or torque value information, and do not refer to actual rotational torques.

Figure 7:
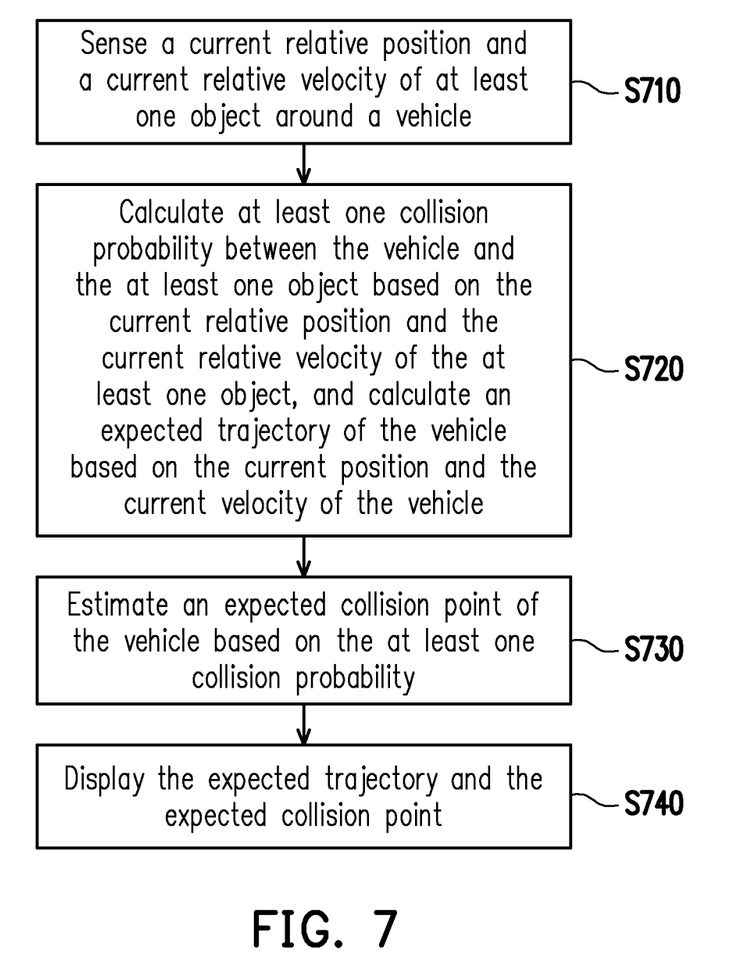
FIG. 7 is a flowchart of a display method for vehicle driving according to an embodiment of the disclosure.
Figure 8:
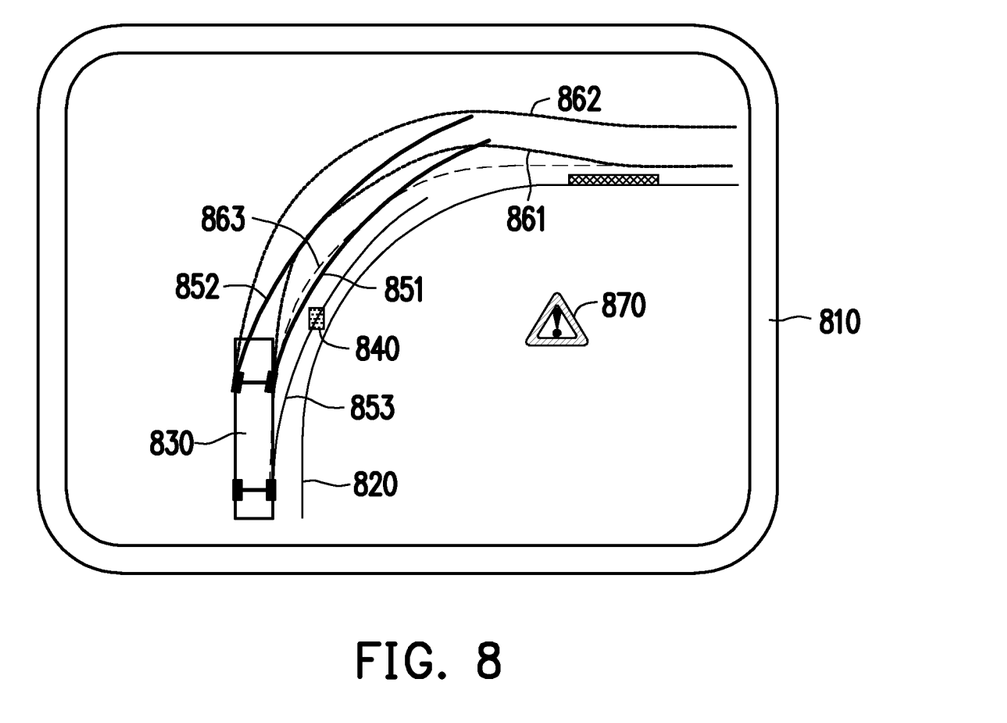
FIG. 8 is a vehicle driving warning information display image according to an embodiment of the disclosure.

FIG. 7 is a flowchart of a display method for vehicle driving according to an embodiment of the disclosure. FIG. 8 is a vehicle driving warning information display image according to an embodiment of the disclosure. Referring to FIG. 7 and FIG. 8, in step S710, the sensor 110 senses a current relative position and a current relative velocity of at least one object around the vehicle, and senses a current position and current velocity of the vehicle. Then, in step S720, the processor 120 receives the current relative position and the current relative velocity of the at least one object, and calculates at least one collision probability $P_{collision}$ (tc) between the vehicle and the at least one object based on the current relative position and the current relative velocity of the at least one object, and calculates an expected trajectory of the vehicle based on the current position and the current velocity of the vehicle. Referring to the related description in FIG. 3 for the calculation of the collision probability $P_{collision}$ (tc), and detail thereof is not repeated. Regarding the calculation of the expected trajectory of the vehicle, the processor 120 may further calculate an expected trajectory of the vehicle according to a vehicle parameter of the vehicle, a steering angle of the steering wheel, the current position, and the current velocity/wheel velocity, where the vehicle parameter is, for example, the vehicle body distribution of the vehicle, but the disclosure is not limited thereto.

In step S730, the processor 120 estimates an expected collision point between the vehicle and the at least one object according to the at least one collision probability $P_{collision}$ (tc) between the vehicle and the at least one object. In an embodiment, the processor 120 may compare the at least one collision probability $P_{collision}$ (tc) with a second probability threshold $P_{TH2}$, and take an object relative position corresponding to the collision probability $P_{collision}$ (tc) that is greater than or equal to the second probability threshold $P_{TH2}$ in the at least one collision probability $P_{collision}$ (tc) as the expected collision point, while object relative positions corresponding to the collision probabilities $P_{collision}$ (tc) that are less than the second probability threshold $P_{TH2}$ in the at least one collision probability $P_{collision}$ (tc) are not taken as the expected collision point.

Then, in step S740, a display device 810 in the vehicle displays the expected trajectory and the expected collision point for the driver's reference. Specifically, the display device 810 may be configured on an upper side, a lower side or other positions of rearview mirrors at both sides of the vehicle for the driver's reference in turning. In an embodiment, when it is detected that turning light of a specific side is turned on or the vehicle is turned to the specific side, the display device 810 next to the rearview mirror corresponding to the specific side is activated, where the specific side may be the left or right side of the vehicle. Regarding the judgment of the vehicle steering, when the processor 120 learns that the turning light of the vehicle is turned on and determines that the vehicle is in an outer lane, or when a steering angle of the steering wheel is greater than a preset threshold, the processor 120 determines that the vehicle is turning.

Referring to FIG. 8, when the processor 120 determines that a vehicle 830 is turning, for example, turning to the right, the display device 810 next to the rearview mirror on the right side of the vehicle 830 may be activated and display a curb 820, the vehicle 830, an object 840 (the expected collision point), expected trajectories 851, 852, 853, and reference trajectories 861, 862, 863 in a top view manner. The curb 820 and the object 840 may be sensed by the sensor 110 and acquired by the processor 120 through recognition, and may also be acquired by the processor 120 from map information for display. The object 840 may be a street lamp, a safety island, a vehicle, a pedestrian, etc., but the disclosure is not limited thereto. In detail, the expected trajectory 851 is an (curve) inner front wheel path, the expected trajectory 852 is an outer front wheel path, and the expected trajectory 853 is an inner rear wheel path. The expected trajectories 851, 852, and 853 of the vehicle 830 may be calculated according to the related description of FIG. 7, and detail thereof is not repeated. It should be noted that, in an embodiment, the vehicle 830 is a large vehicle with a long wheel base and a difference of radius between inner wheels, so that the expected trajectories 851, 852, and 853 of the vehicle 830 do not overlap with each other. When any one of the expected trajectories 851, 852, 853 is overlapped with the object 840, the display device 810 highlights and flashes the object 840, and displays a warning symbol 870 to remind the driver that the vehicle 830 will collide with the object 840.

On the other hand, the display device 810 displays the reference trajectories 861, 862, and 863 calculated by the path planner to prevent from collision with the object 840. In detail, the reference trajectory 861 is an inner front wheel recommended path of the vehicle 830 in the curve, the reference trajectory 862 is an outer front wheel recommended path, and the reference trajectory 863 is an inner rear wheel recommended path. It may be seen from FIG. 8 that compared to the expected trajectory 853 (the inner rear wheel path) that may be overlapped with the object 840, the reference trajectory 863 (the inner rear wheel recommended path) will not be overlapped with the object 840 due to a change of the turning path. Therefore, the driver may refer to the display content of the display device 810 to learn expected collision point information between the expected trajectories 851, 852, 853 of the vehicle 830 and the object 840 in turning, and the display device 810 provides the reference trajectories 861, 862, 863 for the driver's reference in turning to prevent from collision.

In summary, the disclosure may calculate the relative positions and the relative position variation amounts of a future time point based on the current relative positions, current relative velocities and the types of the objects around the vehicle, thereby further calculating the collision probabilities, and judging whether to assist adjusting the driving dynamics of the vehicle according to the collision probabilities, and there is no need to wait for the surrounding objects to be on the expected trajectory of the vehicle before performing velocity control or steering control, so as to prevent side collision accidents caused by the difference of radius between inner wheels. On the other hand, the disclosure further displays the expected trajectory, the expected collision point and the reference trajectory next to the rearview mirror on the turning side in a top view manner before turning, so as to provide the driver with reference information and prevent the driver from mis-estimating the difference of radius between inner wheels due to visual blind spots.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An apparatus for determining whether to adjust driving dynamics of a vehicle, comprising:

a sensor, configured to sense at least one object around the vehicle, obtain image data of each of the at least one object, and measure a distance and a velocity of each of the at least one object around the vehicle to obtain a current relative position and a current relative velocity of each of the at least one object around a vehicle;

a processor, coupled to the sensor, and configured to
estimate a first relative position of each of the at least one object at a first time according to the current relative position and the current relative velocity of each of the at least one object,
recognize the image data to obtain a type of each of the at least one object,
look-up a table to learn a maximum acceleration of each of the at least one object through the table,
estimate a first relative position variation amount of each of the at least one object according to the maximum acceleration of each of the at least one object and a constant acceleration motion equation,
calculate a position probability distribution of each of the at least one object at the first time according to the first relative position and the first relative position variation amount, wherein the first relative position variation amount determined by the maximum acceleration affects a shape and range of the position probability distribution,
calculate at least one collision probability between the vehicle and each of the at least one object at the first time according to the position probability distribution, and a center of gravity trajectory and a vehicle body distribution of the vehicle,
calculate a plurality of deceleration values required for preventing the vehicle from colliding with the at least one object at at least one time point between current time and the first time according to the current velocity of the vehicle, a distance travelled by the vehicle between the current time and the first time, and the at least one collision probability,
calculate a plurality of expected trajectories of the vehicle based on the current position and the current velocity of the vehicle, wherein each of the plurality of expected trajectories respectively corresponds to an inner front wheel in a curve side of the vehicle, an outer front wheel of the vehicle and an inner rear wheel in the curve side of the vehicle, and the plurality of expected trajectories without overlap with each other,
determine whether to adjust the driving dynamics of the vehicle based on the plurality of deceleration values and the at least one collision probability, and
in response to determining to adjust the driving dynamics of the vehicle, the processor is further configured to:
adjust a velocity of the vehicle based on the plurality of deceleration values to prevent collision with the at least one object by providing a driving signal to a motor of the vehicle; and
adjust a steering direction of the vehicle based on the at least one collision probability, a reference trajectory and a driving direction of the vehicle by driving a steering motor of the vehicle,
thereby preventing collision with the at least one object by providing proactive collision avoidance before the at least one object enters any of the expected trajectories of the vehicle.

2. The apparatus for determining whether to adjust the driving dynamics of the vehicle as claimed in claim 1, wherein the processor further obtains the current relative position of each of the at least one object from map information.

3. The apparatus for determining whether to adjust the driving dynamics of the vehicle as claimed in claim 1, wherein determining whether to adjust the driving dynamics of the vehicle based on the at least one collision probability comprises:
selecting a maximum deceleration corresponding to each of the at least one object from each of at least one deceleration corresponding to each of the at least one object;
selecting a maximum reference deceleration from all of at least one maximum deceleration; and
comparing the maximum reference deceleration with a deceleration threshold to determine whether to adjust the current velocity of the vehicle.

4. The apparatus for determining whether to adjust the driving dynamics of the vehicle as claimed in claim 3, wherein
when the maximum reference deceleration is greater than or equal to the deceleration threshold, the current velocity of the vehicle is adjusted, and
when the maximum reference deceleration is less than the deceleration threshold, the current velocity of the vehicle is not adjusted.

5. The apparatus for determining whether to adjust the driving dynamics of the vehicle as claimed in claim 3, wherein the processor further calculates the at least one deceleration according to a weight function, and the weight function is a function of the at least one collision probability.

6. The apparatus for determining whether to adjust the driving dynamics of the vehicle as claimed in claim 1, wherein determining whether to adjust the driving dynamics of the vehicle based on the at least one collision probability further comprises:
performing trajectory tracking control according to a reference trajectory and a driving direction of the vehicle to generate a reference torque, wherein the reference trajectory is a recommended trajectory for the vehicle to prevent from collision;
performing a torque superimposition calculation on the reference torque and a current torque provided by a steering motor to generate a correction torque;
comparing the correction torque with a torque threshold to generate an auxiliary torque;
comparing the at least one collision probability and a first probability threshold to determine whether to superimpose the auxiliary torque and a driver torque to generate an output torque; and
determining whether to drive the steering motor to perform steering according to the output torque.

7. The apparatus for determining whether to adjust the driving dynamics of the vehicle as claimed in claim 6, wherein
when the correction torque is greater than or equal to the torque threshold, the torque threshold is taken as the auxiliary torque, and
when the correction torque is less than the torque threshold, the correction torque is taken as the auxiliary torque.

8. The apparatus for determining whether to adjust the driving dynamics of the vehicle as claimed in claim 6, wherein
when at least one of the at least one collision probability is greater than or equal to the first probability threshold, the auxiliary torque is superimposed to the driver torque to generate the output torque, and
when each of the at least one collision probability is less than the first probability threshold, the output torque is generated according to the driver torque.

9. A method for determining whether to adjust driving dynamics of a vehicle, comprising:
sensing at least one object around the vehicle, obtaining image data of each of the at least one object, and measuring a distance and a velocity of each of the at least one object around the vehicle to obtain a current relative position and a current relative velocity of each of the at least one object around a vehicle;
estimating a first relative position of each of the at least one object at a first time according to the current relative position and the current relative velocity of each of the at least one object;
recognizing the image data to obtain a type of each of the at least one object, look-up a table to learn a maximum acceleration of each of the at least one object through the table;
estimating a first relative position variation amount of each of the at least one object according to the maximum acceleration of each of the at least one object and a constant acceleration motion equation;
calculating a position probability distribution of each of the at least one object at the first time according to the first relative position and the first relative position variation amount, wherein the first relative position variation amount determined by the maximum acceleration affects a shape and range of the position probability distribution;
calculating at least one collision probability between the vehicle and each of the at least one object at the first time according to the position probability distribution, and a center of gravity trajectory and a vehicle body distribution of the vehicle;
calculating a plurality of deceleration values required for preventing the vehicle from colliding with the at least one object at at least one time point between current time and the first time according to the current velocity of the vehicle, a distance travelled by the vehicle between the current time and the first time, and the at least one collision probability;
calculating a plurality of expected trajectories of the vehicle based on the current position and the current velocity of the vehicle, wherein each of the plurality of expected trajectories respectively corresponds to an inner front wheel in a curve side of the vehicle, an outer front wheel of the vehicle and an inner rear wheel in the curve side of the vehicle, and the plurality of expected trajectories without overlap with each other,
determining whether to adjust the driving dynamics of the vehicle based on the plurality of deceleration values and the at least one collision probability; and
in response to determining to adjust the driving dynamics of the vehicle:
adjusting a velocity of the vehicle based on the plurality of deceleration values to prevent collision with the at least one object by providing a driving signal to a motor of the vehicle; and
adjusting a steering direction of the vehicle based on the at least one collision probability, a reference trajectory and a driving direction of the vehicle by driving a steering motor of the vehicle,
thereby preventing collision with the at least one object by providing proactive collision avoidance before the at least one object enters any of the expected trajectories of the vehicle.

10. The method for determining whether to adjust the driving dynamics of the vehicle as claimed in claim 9, further comprising: obtaining the current relative position of each of the at least one object from map information.

11. The method for determining whether to adjust the driving dynamics of the vehicle as claimed in claim 9, wherein determining whether to adjust the driving dynamics of the vehicle based on the at least one collision probability comprises:
selecting a maximum deceleration corresponding to each of the at least one object from each of at least one deceleration corresponding to each of the at least one object to generate at least one maximum deceleration corresponding to the at least one object;
selecting a maximum reference deceleration from all of the at least one maximum deceleration; and
comparing the maximum reference deceleration with a deceleration threshold to determine whether to adjust the current velocity of the vehicle.

12. The method for determining whether to adjust the driving dynamics of the vehicle as claimed in claim 11, wherein
when the maximum reference deceleration is greater than or equal to the deceleration threshold, the current velocity of the vehicle is adjusted, and
when the maximum reference deceleration is less than the deceleration threshold, the current velocity of the vehicle is not adjusted.

13. The method for determining whether to adjust the driving dynamics of the vehicle as claimed in claim 11, further comprising calculating the at least one deceleration according to a weight function, wherein the weight function is a function of the at least one collision probability.

14. The method for determining whether to adjust the driving dynamics of the vehicle as claimed in claim 11, wherein determining whether to adjust the driving dynamics of the vehicle based on the at least one collision probability comprises:
performing trajectory tracking control according to a reference trajectory and a driving direction of the vehicle to generate a reference torque, wherein the reference trajectory is a recommended trajectory for the vehicle to prevent from collision;
performing a torque superimposition calculation on the reference torque and a current torque provided by a steering motor to generate a correction torque;
comparing the correction torque with a torque threshold to generate an auxiliary torque;
comparing the at least one collision probability and a first probability threshold to determine whether to superimpose the auxiliary torque and a driver torque to generate an output torque; and
determining whether to drive the steering motor to perform steering according to the output torque.

15. The method for determining whether to adjust the driving dynamics of the vehicle as claimed in claim 14, wherein
when the correction torque is greater than or equal to the torque threshold, the torque threshold is taken as the auxiliary torque, and
when the correction torque is less than the torque threshold, the correction torque is taken as the auxiliary torque.

16. The method for determining whether to adjust the driving dynamics of the vehicle as claimed in claim 14, wherein
when at least one of the at least one collision probability is greater than or equal to the first probability threshold, the auxiliary torque is superimposed to the driver torque to generate the output torque, and
when each of the at least one collision probability is less than the first probability threshold, the output torque is generated according to the driver torque.

17. A display method for vehicle driving, comprising:
sensing at least one object around the vehicle, obtaining image data of each of the at least one object, and measuring a distance and a velocity of each of the at least one object around the vehicle to obtain a current relative position and a current relative velocity of each of the at least one object around a vehicle, and sensing a current position and a current velocity of the vehicle;
estimating a first relative position of each of the at least one object at a first time according to the current relative position and the current relative velocity of each of the at least one object;
recognizing the image data to obtain a type of each of the at least one object, looking-up a table to learn a maximum acceleration of each of the at least one object through the table;
estimating a first relative position variation amount of each of the at least one object according to the maximum acceleration of each of the at least one object and a constant acceleration motion equation;
calculating a position probability distribution of each of the at least one object at the first time according to the first relative position and the first relative position variation amount, wherein the first relative position variation amount determined by the maximum acceleration affects a shape and range of the position probability distribution;
calculating at least one collision probability between the vehicle and each of the at least one object at the first time according to the position probability distribution, and a center of gravity trajectory and a vehicle body distribution of the vehicle, and
calculating a plurality of deceleration values required for preventing the vehicle from colliding with the at least one object at at least one time point between current time and the first time according to the current velocity of the vehicle, a distance travelled by the vehicle between the current time and the first time, and the at least one collision probability;
calculating a plurality of expected trajectories of the vehicle based on the current position and the current velocity of the vehicle, wherein each of the plurality of expected trajectories respectively corresponds to an inner front wheel in a curve side of the vehicle, an outer front wheel of the vehicle and an inner rear wheel in the curve side of the vehicle, and the plurality of expected trajectories without overlap with each other;
estimating an expected collision point of the vehicle based on the at least one collision probability; and
responsive to detecting driver input from a turn signal and/or steering wheel, displaying in a top view manner the plurality of expected trajectories including an expected trajectory corresponding to the inner rear wheel in the curve side of the vehicle and the expected collision point, wherein the displayed plurality of expected trajectories enable proactive collision avoidance before the at least one object enters any of the expected trajectories of the vehicle.

18. The display method for vehicle driving as claimed in claim 17, wherein when it is detected that a turning light on a specific side is turned on or the vehicle is turned to the specific side, a display device next to a rearview mirror corresponding to the specific side is activated.

19. The display method for vehicle driving as claimed in claim 17, wherein when it is determined that the vehicle is turning, the expected trajectory corresponding to the inner rear wheel in the curve side of the vehicle, the expected collision point, and a reference trajectory of the vehicle are displayed in the top view manner, wherein the reference trajectory is a recommended trajectory for preventing the vehicle from colliding with any of the at least one object.

20. The display method for vehicle driving as claimed in claim 19, wherein the method further comprises:
    determining that the vehicle is turning when a turning light of the vehicle is turned on and it is determined that the vehicle is in an outer lane or when a steering angle of a steering wheel is greater than a preset threshold.

21. The display method for vehicle driving as claimed in claim 19, wherein the reference trajectory comprises an outer front wheel recommended path, an inner front wheel recommended path, and an inner rear wheel recommended path of the vehicle in a curve.

22. The display method for vehicle driving as claimed in claim 17, wherein calculating the plurality of expected trajectories of the vehicle based on the current position and the current velocity of the vehicle comprises:
    calculating the plurality of expected trajectories according to a vehicle parameter, a steering angle of a steering wheel, and the current velocity or a wheel velocity.

23. The display method for vehicle driving as claimed in claim 17, wherein estimating the expected collision point based on the at least one collision probability comprises:
    comparing the at least one collision probability with a second probability threshold; and
    taking a relative position corresponding to the at least one collision probability greater than or equal to the second probability threshold in the at least one collision probability as the expected collision point.

24. The display method for vehicle driving as claimed in claim 17, wherein when the expected trajectory corresponding to the inner rear wheel in the curve side of the vehicle is overlapped with any one of the at least one object, the overlapped object is displayed in highlighting and flashing, and a warning symbol is displayed.

* * * * *